United States Patent [19]

Chafvin, Jr.

[11] Patent Number: 4,775,502
[45] Date of Patent: Oct. 4, 1988

[54] PROCESS FOR PRODUCTION OF MICROCELLULAR RESIN CASTINGS

[76] Inventor: Harry H. Chafvin, Jr., 268 McGregor Ave., Cincinnati, Ohio 45219

[21] Appl. No.: 891,587

[22] Filed: Aug. 1, 1986

[51] Int. Cl.$^4$ .................... C08J 9/28; C08J 9/42; B29C 35/04; B29C 39/12

[52] U.S. Cl. .................. 264/41; 264/53; 264/129; 264/236; 264/331.21; 264/337; 264/347; 264/DIG. 13; 521/64

[58] Field of Search ............... 264/51, 53, 236, 347, 264/129, 337, 41, DIG. 13, 331.21; 521/64

[56] References Cited

U.S. PATENT DOCUMENTS

| | | | |
|---|---|---|---|
| Re. 27,444 | 7/1922 | Will | 521/64 X |
| 2,141,788 | 12/1938 | Hurt | 264/236 |
| 2,369,593 | 2/1945 | Marks et al. | 264/236 X |
| 2,707,804 | 5/1955 | Thornburg | 264/50 X |
| 2,908,943 | 10/1959 | Miller | 264/236 X |
| 3,051,992 | 9/1962 | Bradley | 264/347 X |
| 3,256,219 | 6/1966 | Will | 521/64 X |
| 3,679,783 | 7/1972 | McGarr | 264/236 X |
| 3,734,867 | 5/1973 | Will | 521/64 X |
| 3,802,949 | 4/1974 | Brown et al. | 264/53 X |
| 3,975,348 | 8/1976 | Christena | 521/64 X |
| 4,076,784 | 2/1978 | Hart, Jr. et al. | 264/236 X |
| 4,077,931 | 3/1978 | Leitheiser et al. | 521/64 X |
| 4,384,047 | 5/1983 | Benzinger et al. | 521/64 X |
| 4,486,367 | 12/1984 | Shimomura | 264/236 X |
| 4,517,356 | 5/1985 | Lambert et al. | 264/236 X |
| 4,680,155 | 7/1987 | Rochefort et al. | 264/236 X |

FOREIGN PATENT DOCUMENTS 1458203 12/1976 United Kingdom .
1494739 12/1977 United Kingdom .

OTHER PUBLICATIONS

Ashland Chemical Company, "Aropol WEP Resins", 1980—Bulletin 1437, 3 pages.
Reichhold Chemicals, Inc., "Polylite Polyester Resin 32-182", Aug. 1984—Product Bulletin, 5 pages.
Reichhold Chemicals, Inc., "Polylite Polyester Resin 32-183", Aug. 1984—Product Bulletin, 5 pages.

Primary Examiner—Philip Anderson
Attorney, Agent, or Firm—Frost & Jacobs

[57] ABSTRACT

A process for producing a microcellular cast resin product, by casting a water-in-oil emulsion of polymerizable components which will gel and partially polymerize by an exothermic reaction, and placing the partially polymerized casting in a fluid medium maintained at a temperature and pressure such that evaporation of water and monomers is inhibited but sufficient to promote complete polymerization while retaining dispersed water within a microcellular structure. The water content of the emulsion can range from about 1% to about 90% by weight, and the microcellular structure may be either the open cell or the closed cell type.

27 Claims, 1 Drawing Sheet

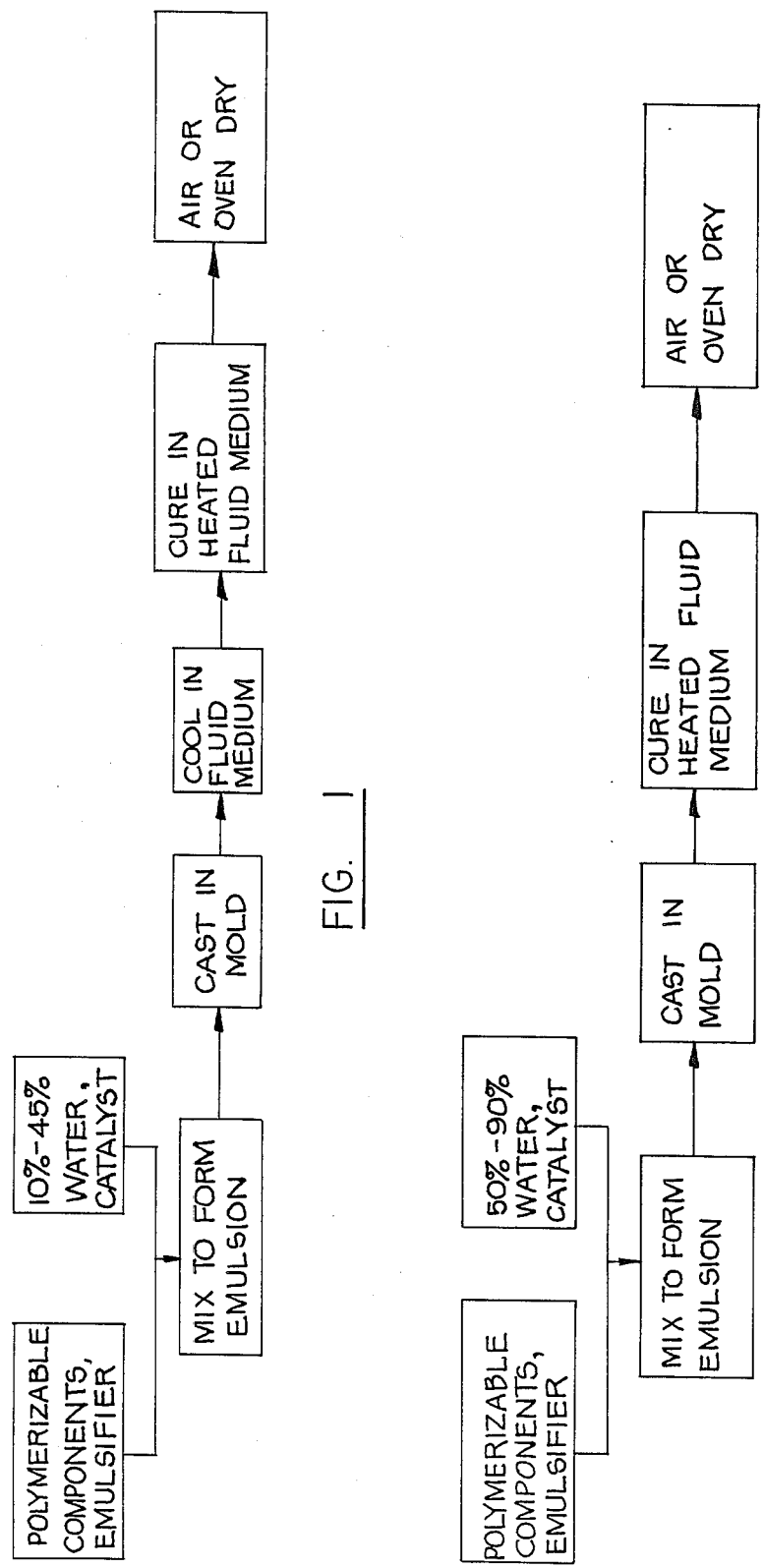

PROCESS FOR PRODUCTION OF MICROCELLULAR RESIN CASTINGS

BACKGROUND OF THE INVENTION

This invention relates to a process for production of microcellular or porous cast resin products utilizing water-in-oil emulsioss of polymerizable components. The process of the invention achieves complete polymerization of the resin components, thereby minimizing shrinking and warping of the cast final product and providing improved strength, throughout a wide range of water contents in the emulsions. This is accomplished by placing the casting in a fluid medium maintained at a temperature and pressure such that evaporation of water and polymerizable components is inhibited but sufficient to promote continued and complete cross-linking of the polymerizable components.

While not so limited, the process of the present invention has particular utility in the fabrication of picture frames, reproductions of bas relief or sculptured art objects and similar decorative items, furniture parts and overlays, and structural members of relatively high strength and rigidity. Castings made in accordance with the invention can be cut, machined and nailed.

U.S. Pat. No. Re. 27,444 (original U.S. Pat. No. 3,256,219) discloses a process for the production of porous resin products which comprises forming a water-in-oil emulsion composed of an aqueous medium (as the dispersed phase), and (as the continuous phase) a polymerizable organic liquid containing at least one ethylenically unsaturated group and a substantially water-insoluble polymeric compound acting as an emulsifier, polymerizing the organic liquid without breaking the emulsion, thereby forming a solid resin material having water droplets dispersed therein, and drying, either at elevated temperature, in a vacuum, or allowing it to stand in a current of air.

This patent indicates that the aqueous phase remains in dispersed state after the monomers are polymerized by use of microgels acting as emulsifiers. Preferred polymerizable organic liquids include vinyl esters, acrylic acid esters, methacrylic acid esters, styrene, acrylonitrile and unsaturated hydrocarbon halides.

The preferred polmeric compound acting as an emulsifier may include polymerizable carboxylic acids, such as acrylic acid, an unsaturated polyester, polystyrene, and polyvinyl esters. When polystyrene is used as the emulsifier, a molecular weight of at least 10,000 is preferred. The water content of such emulsions is at least 25% by weight and preferably may range from at least about 40% by weight to not less than about 70% by weight.

U.S. Pat. No. 4,077,931, assigned to Ashland Oil, Inc., discloses thermosetting water-in-oil emulsions comprising water as the dispersed phase, unsaturated polyester having a mean molecular weight ranging from 1,800 to 100,000, the polyester being the reaction product of polycarboxylic acid, at least a portion of which is $\alpha, \beta$ ethylenically unsaturated, and a polyhydric alcohol, and an ethylenically unsaturated solvent for the polyester which is copolymerizable therewith. The weight ratio of polyester and solvent to water is allegedly in the range of 1:10 to 10:1, while the weight ratio of polyester to solvent is in the range of 10:1 to 1:10.

The polyesters of this patent are formed from polycarboxylic acids of 4 to 18 carbon atoms such as malonic acid, adipic acid, succinic acid, phthalic, isophthalic, and terephthalic acids, fumaric acid or maleic acid. Acid anhydrides may also be used. These are reacted with polyhydric alcohols such as ethylene glycol, diethylene glycol, propylene glycols and the like.

Solvents which are copolymerizable with the polyester include styrene, vinyl toluene, acrylonitrile, acrylate and methacrylate esters, vinyl esters and the like. These are in monomeric form in the emulsion.

A peroxide catalyst, cobalt compounds and a tertiary aromatic amine are also present as polymerization promoters and initiators.

The emulsions of U.S. Pat. No. 4,077,931 are alleged to be stable and, when cast into a mold, polymerize or cure partially by an exothermic reaction without phase separation to a product having a microcellular structure.

Bulletin 1437 entitled "Aropol WEP ® Resins", published in 1980 by Ashland Chemical Company (a division of Ashland Oil, Inc., the assignee of U.S. Pat. No. 4,077,931) describes water-extended casting resin emulsions of two general types. One type is that disclosed in U.S. Pat. No. 4,077,931 which produces a so-called closed cell foam, while the other type is that disclosed in U.S. Pat. No. Re. 27,444 producing a so-called open cell foam. While a wide range of emulsion water contents is alleged to be operative in these two patents, Bulletin 1437 clearly indicates that the water content must be controlled within the range of 50% to 60% by weight. Even an increase in water content from 50% toward 60% in the closed cell type is stated to produce reduced strength, reduced peak exotherm temperature, increased emulsion viscosity, increased gel time, and increased water loss rate. The only counterbalancing advantage is reduced cost. There is no indication that more than 50% water can be used in the open cell type.

According to Bulletin 1437, when producing closed cell type products the part is permitted to reach the peak exotherm temperature after casting and is then removed from the mold. A shrinkage of about 1% to 2% occurs during curing in the mold. The casting is next permitted to cool to room temperature and is stated to be about 90% cured in one hour. The product is then permitted to stand for 24 hours at ambient temperature, prior to painting. Thereafter, further long term shrinkage occurs, amounting to about 2% after 2 years, accompanied by a weight loss of about 12%.

When producing open cell type castings the product ". . . will continue to shrink until the final dehydrated part is 4% to 5% smaller than the mold." Open cell castings should be dehydrated, according to Bulletin 1437, by heating in an oven maintained at 150° to 200° F. Castings dehydrated at room temperature and subjected to elevated temperatures later ". . . will relax to their final size of approximately 95% of the mold size."

It is thus alleged that there is about 1% difference in shrinkage when subjected to oven heating (about 4% to 5%) as compared to dehydration at room temperature and heating at a later time (about 5%). This indicates some further, but still incomplete, curing or cross-linking of the resin when oven heating is conducted immediately after cooling to room temperature.

Bulletin 1437 states that since shrinkage and warpage of closed cell type products are unavoidable and variable, the cast products cannot be used in applications in which dimensional stability is critical, such as in furniture parts.

Product bulletins published by Reichhold Chemicals, Inc. in August 1984 describe polyester resin compositions intended for use as water filled castings. A rigid resin composition (closed cell type designated Polylite ® Polyester Resin 32-183) and a resilient resin composition (closed cell type designated Polylite ® Polyester Resin 32-182) are stated to contain more than 40% unsaturated orthophthalic polyester resin and from 56% to 60% styrene monomer. After mixing with water with vigorous agitation and addition of 1% to 2% methyl ethyl ketone peroxide catalyst, a moderate exothermic cure is alleged to be obtained with an emulsion containing 50% by weight water. After casting the recommended procedure is an overnight cure at room temperature and a post-cure for two hours at 121° C. (250° F.). The bulletins state that the cured water-filled castings will in time lose some entrapped water and hence do not maintain dimensional stability. Accordingly, the resin compositions are not recommended ". . . for use in castings or parts which must maintain a high degree of dimensional stability."

It is to be noted that the Ashland publication (Bulletin 1437) indicates that substantially greater shrinkage occurs with open cell than with closed cell castings.

U.S. Pat. No. 2,707,804 discloses apparatus for steam curing foamed latex, comprising a mold having hollow cores projecting into the mold at selected points, each core having an apertured wall through which dry superheated steam is discharged into the latex foam surrounding the cores, at a pressure of less than 2 psig. The latex is cured by the dry steam. The apparatus is alleged to be effective in curing a cellular latex mass 2 inches thick in about 5 minutes and a cellular latex mass 4 inches thick in about 15 minutes. The steam supplied to the mold is preferably superheated to about 300° F., but is permitted to expand with consequent reduction in pressure and is passed through a filter for removal of condensed water so that the pressure when entering the hollow cores does not exceed 2 psig. The temperature of the dry steam at this point is not disclosed but is of course less than 300° F. The use of dry steam is necessary for natural or synthetic latices since such a latex is an oil-in-water emulsion. Wet steam would cause the latex to sag in the mold since excessive water would be introduced into the open cell latex foam.

U.S. Pat. No. 4,384,047 discloses a process for producing an ultrafiltration membrane of a vinylidene fluoride polymer, or copolymer thereof with tri- or tetrafluoroethylene. Minor amounts of methyl methacrylate can also be included. A solution of the polymer components in an organic solvent such as triethyl phosphate, hexamethyl phosphoramide, or 1-methyl-2-pyrrolidinone, is formed with the solvent ranging from about 65 to about 80% by weight. From about 1% to 10% by weight of a non-solvent is added, such as glycerol, ethylene glycol, or phosphoric acid, and the liquid mixture is cast on a smooth solid surface to form a thin (10 to 20 mils) sheet. A portion of the solvent and non-solvent is then evaporated from the sheet, preferably at ambient temperature, and the sheet is next contacted with a liquid gelation medium maintained at a temperature ranging from about −10° to about +50° C., preferably 0° to 5° C. A stabilizing treatment may later be conducted which involves immersing the sheet in warm water or heating in an oven, at a temperature ranging from about 20° to about 100° C., with maximum shrinkage occurring after about 30 minutes at 100° C. The resulting membrane is stated to have a pore size range suitable for ultrafiltration, with a surface layer containing pores having a diameter ranging from about 1 to about 100 millimicrons and a support layer thicker than and having less resistance to fluid flow than the surface layer.

In this method the purpose of the liquid gelation step is to prevent wrinkling of the cast film, which is not physically restrained. In the specific examples the membrane or film floated free of the casting surface during the gelation step. The optional heat stabilization may be conducted before or after drying of the membrane, the stated purpose being to avoid shrinkage when the membrane is used to filter heated fluids. Actually, the heat stabilization results in pre-shrinking.

Other prior art relating to porous resin products includes U.S. Pat. Nos. 3,734,867; 3,975,348 and 4,522,953.

Despite efforts by several large corporations over a period of years to develop water-in-oil resin emulsions and processes for economical production of porous, microcellular cast resin products, no solution has yet been discovered for the problem of shrinkage and warpage in low cost cast products. Accordingly, these prior art products cannot be used in applications wherein dimensional stability in the as-cast condition is critical, thus excluding a potentially large market in such fields as furniture parts.

SUMMARY OF THE INVENTION

It is a primary object of the present invention to provide a process for production of a low cost microcellular, cast resin product which overcomes the problem of unpredictable shrinkage and warpage.

It is a further object to provide a process wherein the water content of a water-in-oil emulsion containing polymerizable components can range anywhere from about 1% to about 90% by weight, without adverse effect on the dimensional stability of the final resin product. The capability of utilizing an emulsion of high water content provides the potential for greatly reducing costs, while the capability of using an emulsion of low water content makes it possible to produce cast resin products of relatively high strength and rigidity. The products can be either open cell type or closed cell type.

It is still another object of the invention to provide a process wherein reproducibility or repeatability of normal shrinkage for a polyester resin is consistently achieved, at least when the emulsion contains about 50% water.

According to the invention there is provided a process for production of a microcellular, cast resin product, comprising the steps of providing a water-in-oi emulsion containing polymerizable components, polymerization initiators for said components, emulsifier, and water, said components and initiators being so selected as to cause an exothermic reaction resulting in partial polymerization of said components; casting said emulsion in a mold wherein said emulsion converts to a gel having a microcellular structure within which water is dispersed and wherein said exothermic reaction starts with resultant partial polymerization of said components without breaking said emulsion; placing the partially polymerized casting in a fluid medium maintained at a temperature and pressure such that evaporation of water and polymerizable components from said casting is inhibited but sufficient to promote continued cross linking of said components; and retaining said casting in said fluid medium for a time sufficient to bring all parts of said casting to a temperature which completes polymerization of said components while retaining water and polymerizable components within said microcellular structure and minimizing shrinkage and warpage of the resulting resin product.

Preferably the fluid medium is a water bath maintained at a temperature ranging from about 60° to 100° C. (about 140° to 212° F.).

When producing a rigid, high strength product using an emulsion having a water content ranging from about 1% to less than about 50% by weight, the peak exothermic temperature of the cast gel is controlled by placing the casting in a liquid or atmosphere maintained at a temperature not exceeding about 20° C. (about 68° F.) for a period of time sufficient to terminate the exothermic reaction before the temperature of the casting reaches 100° C. (212° F.)

BRIEF DESCRIPTION OF THE DRAWING

FIG. 1 is a flow sheet of the process of the invention for an open cell type emulsion containing from about 10% to about 5% by weight water; and FIG. 2 is a flow sheet of the process of the invention for an open cell type emulsion containing from about 50% to about 0% by weight water.

DETAILED DESCRIPTION OF THE INVENTION

Emulsions in accordance with the above-mentioned U.S. Pat. Nos. Re. 27,444 and 4,077,931 and the Reichhold Chemicals, Inc. product bulletins may be used in the practice of the present invention. The disclosures of these publications are to be considered as incorporated by reference herein. However, in compliance with the statutory requirement to set forth the best mode of carrying out the invention, the following summary of suitable and preferred resin emulsions is given:

The polymerizable components are monomers, at least part of which contain at least one ethylenically unsaturated group and may include at least one of an acrylic acid ester, a methacrylic acid ester, styrene, acrylonitrile, and a vinyl ester. Styrene is a preferred monomer from the standpoint of cost.

The emulsifier may be a substantially water-insoluble polymeric compound which is soluble in the polymerizable components. The polymeric compound may comprise one of an unsaturated polyester obtained from an unsaturated polycarboxylic acid and a polyhydric alcohol; a polyvinyl ester; and polystyrene, by way of non-limiting example. Polystyrene is preferred from the standpont of cost. However, where the monomer is styrene, or predominantly styrene, it is preferred to utilize an unsaturated polyester obtained by reaction of a dicarboxylic acid with a glycol.

Polymerization initiators which may be used include at least one of alkali formaldehyde sulfoxylate, hydrogen peroxide, sodium hydrogen sulfite, cobalt chloride, benzoyl peroxide, lauroyl peroxide, a tertiary amine, and cobalt naphthenate. A peroxide, a cobalt compound and a tertiary amine are preferably all present to ensure rapid exothermic reaction.

The dispersed phase may be ordinary water, but this term is also to be considered as including water-soluble additives, such as lower molecular weight aliphatic alcohols, lower organic acids, inorganic salts or the like, for viscosity control or other purposes.

Alternatively, the continuous phase may include an unsaturated polyester (comprising the emulsifier) obtained by the reaction of a polycarboxylic acid, at least a portion of which is unsaturated, and a polyhydric alcohol. An ethylenically unsaturated solvent for the polyester (comprising the polymerizable components) is preferably copolymerizable therewith.

The polyester may comprise the reaction product of at least one of phthalic acid, isophthalic acid, terephthalic acid, maleic acid and fumaric acid, with a glycol such as ethylene glycol, diethylene glycol, or a propylene glycol.

The ethylenically unsaturated copolymerizable solvent may be a vinyl monomer, styrene, an acrylic acid ester or a methacrylic acid ester. Styrene is preferred from the standpoint of cost.

Polymerization initiators for such an emulsion should include a peroxide catalyst, a cobalt salt promoter, and a tertiary amine promoter. Preferably the cobalt salt is soluble in the continuous phase comprising unsaturated polyester and ethylenically unsaturated solvent therefor.

The weight ratio of polyester to ethylenically unsaturated solvent is preferably from about 1:5 to 2:1.

Emulsions can be used in the practice of the invention which result in microcellular structures which are either intercommunicating, i.e. open cell foam, or non-intercommunicating, i.e. closed cell foam. The differences in formulation required to obtain either type are explained in the above-mentioned U.S. Pat. Nos. Re. 27,444 and 4,077,931. A closed cell foam results from use of a polyester having a molecular weight of at least 1800, as disclosed in U.S. Pat. No. 4,077,931. It will be understood that in the closed cell foam the dispersed water droplets are retained within the interior indefinitely although there is diffusion of water from the cells near the surfaces of the casting to a depth of about ⅛ to 3/16 inch in a 50% water emulsion. In a 60% water emulsion diffusion of water occurs to an even greater depth. On the other hand, the open cell foam permits complete dehydration of water droplets from the casting, but in accordance with the present invention substantially no warpage results from dehydration.

An important feature of the process of the invention is the step of placing the casting in a fluid medium maintained at a temperature and pressure such that evaporation of water and polymerizable components is substantially prevented or at least inhibited but sufficient to promote continued cross-linking or curing of the components. This step is practiced for both open cell and closed cell types of castings and throughout the water content range. While the fluid medium is advantageous in providing more effective heat transfer, the most important effect for the open cell type is to "seal in" the dispersed water, monomers and other volatile components, and thereby to obtain virtually complete polymerization. For the closed cell type the surfaces of the casting are also sealed, and substantially complete cross linking is obtained throughout the structure, so that subsequent shrinkage, warpage and loss of monomers are minimized. This is in sharp contrast to the practice described in the above-mentioned Ashland Chemical Company Bulletin 1437, wherein the casting is removed from the mold and permitted to cool to room temperature. In one hour the resin is stated to be about 90% cured. In the Ashland process the oven heating step for the open cell type is conducted after cooling to room temperature, at which time the cure is substantially less than 90%. This oven heating step thus evaporates the uncured components as well as the water, resulting in weakening and distortion of the cellular structure and uncontrollable shrinkage and warpage.

When producing a casting from an emulsion wherein the water content ranges from about 1% to less than about 50% by weight, the peak exotherm temperature could exceed 100° C. if not controlled. In accordance with the process of the invention, this control is effected by placing the cast gel in a low temperature liquid, such as tap water maintained at a temperature of about 10° to 20° C. for a period of time sufficient to terminate the exothermic reaction before the temperature of the casting reaches 100° C. Alternatively, the cast gel may be placed in a cooling compartment for a period of time sufficient to terminate the exothermic reaction before the temperature of the casting reaches 100° C. Failure to control the exothermic temperature can result in disruption of the microcellular structure as a result of water droplets being converted to steam. The casting is next placed in the fluid medium described above, for complete curing, as shown in FIG. 1.

A water content in the emulsion preferably ranging from about 10% to about 45% by weight can be used to produce cast products either of closed cell or open cell type, and such products will have improved strength and rigidity by reason of the relatively high resin content and complete cross linking of the cast product.

When the water content of the emulsion ranges from about 50% to about 90% by weight, the peak exotherm temperature which is reached generally will be less than 100° C., and the casting can simply be removed from the mold in an ambient atmosphere, after which the casting may be placed without cooling in the fluid medium under the above-described conditions, as shwon in FIG. 2, and is retained therein for a time sufficient to bring all parts of the casting to a temperature such as to ensure that polymerization is substantially 100% complete throughout the entire casting. Thereafter only water is retained within the cells since the monomer is totally cross linked. The cell diameters generally do not exceed about 100 μ and will preferably range from about 1 to 50μ.

For open cell type products, it is preferred to conduct a further step, after completing polymerization in the fluid medium, of heating in a dry atmosphere at a temperature of from about 70° to about 125° C. (about 160° to about 255° F.), in order to evaporate at least a predominant part of the dispersed water particles retained within the microcellular structure. Higher temperature may be used so long as there is no adverse effect on the cured microcellular resin structure. When conducted after complete polymerization, this optional subsequent oven heating step to remove water from the casting results in a product of dimensional stability without the uncontrolled warpage and shrinkage which occur in the prior art drying procedure.

A convenient and effective fluid medium for the practice of this process is a water bath maintained at a temperature ranging between about 60° and 100° C. (about 140° to 212° F.), and preferably between about 75° and 95° C. (about 167° and 203° F.). Such a bath is used at atmospheric pressure, and castings may simply be submerged therein. For more rapid curing, temperatures above 100° may be utilized, up to about 115° C. (about 240° F.). Higher temperatures may be used so long as the monomer which has polymerized does not become too thermoplastic. Saturated steam, oil, halogenated organic heat exchange media or fused salts, selected from types which are inert to the resin components, may be used for operation above 100° C., but it is necessary to maintain the fluid medium under superatmospheric pressure sufficient to prevent boiling of the water dispersed within the microcellular structure.

The minimum temperature of the fluid medium is not critical since complete curing or cross linking can apparently be achieved at temperatures as low as about 50° C. if held for a sufficient length of time. The broadest range is thus from about 50° to about 115° C. (about 120° to about 240° F.). However, in commercial production it is advantageous to operate within a temperature range of about 75° to 100° C. and at atmospheric pressue for optimum efficiency and economy in process equipment costs.

The process of the invention achieves uniformity and repeatability of results, particularly with respect to shrinkage and warpage, regardless of variations in ambient temperature, due to obtention of a complete cure of the resin in the fluid medium. This is in contrast to the prior art practice which experiences unpredictable results with variations in ambient temperature and consequent inability to control the peak exothermic temperature and degree of cure.

In the process of the invention it is possible to use flexible, low density polyethylene molds as permanent production molds, when casting emulsions containing more than 50% water, since the peak exothermic temperature is not high enough to affect such molds adversely, and chemical attack would be negligible. Substitution of such polyethylene molds for the conventional molds (such as latex rubber, silicone rubber and polyurethane) required in prior art processes provides a considerable cost savings. Moreover, when using emulsions of high water content (60% or higher), mold life is greatly extended since chemical attack upon all types of molds is substantially reduced.

Emulsions can be cast by various conventional methods, such as rotational closed mold casting, and open mold casting. Emulsions having a water content of about 85% or more have a high viscosity and can be injection molded. This provides a further advantage in the practice of the invention since emulsions of such high water content could not be successfully cured by prior art methods.

The use of conventional mold release agents may be desirable for mold materials subject to attack by, or reaction with monomers.

When producing closed cell castings from an emulsion containing about 60% to about 90% water, the cell walls are so thin that water can be evaporated from the final product when using certain resin formulations, with the result that the product is light in weight but has relatively high strength and hardness, sufficient for use as furniture overlays. In prior art closed cell castings the dispersed water droplets in the interior are retained indefinitely because of the relatively thick cell walls resulting from the required 50% water content of the emulsion, although there is some loss of water near the surface. When the process of the invention is conducted with emulsions having a water content of 25% to 40%, the cell walls are of such thickness that diffusion of water is extremely difficult and limited. Such a casting is much more stable with respect to shrinkage.

When producing open cell castings from emulsions having a water content greater than 50%, release of water from the final product is more rapid than in a prior art open cell casting, also because of the relatively thin cell walls. This provides the dual advantage of decreased cost and rapid dehydration, without the risk of collapsing the cells which probably occurs with the loss of monomers during the oven drying step described in the above-mentioned Bulletin No. 1437. In this connection, it is believed that in the oven drying step of Bulletin 1437 the maximum temperature of the casting probably does not exceed about 55° C. (130° F.) as long as water is present, because the water causes cooling by evaporation.

The versatility of the process of this invention, in comparison to prior art practice, can better be appreciated from the following considerations:

Under prior art practice, an emulsion containing less than about 45% by weight water probably could not be cast successfully because the peak exothermic temperature could exceed 100° C., which would result in conversion of the dispersed water droplets in the casting to steam, with consequent disruption of the microcellular structure. In the present process the exotherm temperature is controlled when the water content in the emulsion is less than about 50% by weight, by placing the casting in a low temperature medium for a period of time sufficient to terminate the exothermic reaction before the temperature of the casting reaches 100° C.

Under prior art practice, a water content substantially greater than about 50% by weight, e.g. about 60% to 70% by weight, results in a peak exothermic temperature which is insufficient to obtain even a 90% cure. When such a casting is subjected to the prior art oven heating required for the open cell type, the result is reduced strength, excessive shrinking, and warping, because substantial quantities of monomers are evaporated. In contrast to this, the fluid medium of the present process retains the monomers and dispersed water within the microcellular structure until all parts of the casting reach a temperature at which complete polymerization is obtained, along with retention of water within the cells.

Thus, the prior art practice is dependent solely on the peak exothermic temperature in attempting to obtain a complete cure, and this in turn restricts the emulsion water content to about 50%.

Castings can be produced in accordance with the invention over a wide range of sizes and thicknesses. Generally, thicknesses up to about 4 inches are contemplated. When the thickness does not exceed about 2 inches, it is preferred to retain the casting in the fluid medium until all parts of the casting reach a substantially uniform temperature. Variation of the duration of immersion of the casting in the fluid medium in direct proportion to the thickness of the casting will ensure that a sufficiently high temperature is reached throughout the casting to obtain compleee curing therethrough. For thicknesses ranging from about ¼ inch to 2 inches a time of from less than about 5 minutes to about 30 minutes in a water bath at a temperature of about 95° C. is adequate to reach a uniform through-thickness temperature. Somewhat longer times have no adverse effect.

Additives of conventional types may be included for desired properties. Thus, fire retardant agents, dyes, pigments, plasticizers, fillers, mold release compounds and the like may be useful for some applications. Moreover, a polyurethane surface coating could be applied to products which may require added abrasion resistance.

The following examples illustrate various embodiments and are not to be construed as limiting the invention thereto.

EXAMPLE 1

5 parts by weight of polystyrene formed by emulsion polymerization in the presence of persulfate are added to 92.5 parts of methyl methacrylate monomer, along with 3.5 parts of a 50% benzoylperoxide catalyst and 1.7 parts of dimethyl-p-toluidine. 100 parts of water are added gradually with vigorous stirring to form a homogeneous water-in-oil emulsion, containing 50% by weight water. The emulsion is cast in molds at ambient temperature and retained in the molds until a porous open cell type partially cured product is formed containing water in dispersed form. The castings are then removed from the molds and placed in a water bath maintained at 95° C. (203° F.). The castings, having an average thickness of about ½ inch and a length of 22½ inches, are removed from the water bath after 30 minutes. No odor of monomer can be detected after cooling Shrinkage is about 2% to 3%, and there is minimal warpage after dehydration.

For comparison with prior art practice, a second batch of identical composition is cast in molds and retained therein until a porous partially cured product is formed containing water in dispersed form. The castings are cooled to room temperature after removal from the molds and heated in an oven at 70° C. (158° F.) for 12 to 20 hours. After removal from the oven and cooling, shrinkage is found to be about 4%, and there is generally some warpage.

Shrinkage is measured by subtracting the outside linear dimension of the casting from the inside linear dimension of the mold, dividing the difference by the inside dimension of the mold and multiplying by 100.

EXAMPLE 2

A closed cell type water-in-oil emulsion is prepared as follows:

A polyester is formed by conventional reaction of maleic anhydride, phthalic anhydride and diethylene glycol in proportions such that the acid number is about 17 (mg KOH). 100 g samples of polyester are mixed with 150 g of styrene per sample, to which are added 1.5% cobalt octoate and 0.5% dimethylaniline to provide 250 g of solution per sample. 375 g of water are added to each sample with vigorous stirring to form a homogeneous water-in-oil emulsion containing 60% by weight water. Samples are cast into flexible, low density polyethylene molds where an exothermic reaction starts, and the castings form closed cell partially cured castings containing water in dispersed form. The castings are removed from the molds, placed in a water bath maintained at a temperature of 75° C. (167° F.) and held in the bath for 30 minutes. The castings are then removed from the bath and examined for shrinkage and warpage. Shrinkage is less than 1%, and there is no visible warpage.

EXAMPLE 3

Closed cell type polyester resin supplied by Ashland Chemical Company under the trademark AROPOL WEP 662P (polyester in styrene monomer) was cast with no water addition (i.e., no emulsification) in a 7 inch mold after mixing with 1.5% methyl ethyl ketone peroxide catalyst. The castings were removed from the mold after the peak exothermic temperature was passed and placed in a bath of water maintained at 100° C. for 20 minutes. The castings were then cooled to room temperature, and linear shrinkage was measured and determined to be about 2.7%. Warpage was very slight to none by visual inspection. After 40 days shrinkage was measured and determined to be about 3%.

EXAMPLE 4

The polyester resin of Example 3 (AROPOL WEP 662P) was mixed with water, with vigorous agitation, in an amount sufficient to form a water-in-oil emulsion containing 60% by weight water. 1.5% methyl ethyl ketone peroxide catalyst was added and mixed uniformly. Samples were cast in 7 inch molds and removed therefrom after partial curing. One sample was placed in a water bath maintained at 100° C. and held for 30 minutes. Another sample was placed in a water bath maintained at 75° C. and held for 30 minutes. Both castings were then cooled to room temperature, and linear shrinkage was measured and determined to be less than 1%. Warpage appeared to be very slight to none by visual inspection. After three days no additional shrinkage could be detected. After forty days shrinkage was again measured, and total linear shrinkage was determined to be about 1.3%.

A comparison of Examples 3 and 4 thus indicates that shrinkage of polyester resin emulsions of the closed cell type containing more than 50% water is substantially less than the shrinkage of the same pure resin containing no water emulsified therein.

EXAMPLE 5

The polyester closed cell type resin of Example 3 was mixed with water, with vigorous agitation, in an amount sufficient to form a water-in-oil emulsion containing 25% by weight water. After addition and uniform mixing of 1.5% methyl ethyl ketone peroxide catalyst samples were cast in 7 inch molds. When the exothermic reaction started, the castings were removed from the molds and placed in a bath of tap water maintained at a temperature of about 15° C. After 15 minutes in this bath a sample was removed, placed in a hot water bath maintained at 70° C. and kept there for 30 minutes. A second sample was removed from the 15° C. water bath after 20 minutes, placed in a steam pressure cooker and heated under 15 psi pressure at 115° C. (240° F.) for 10 minutes. Both samples were then cooled to room temperature, and linear shrinkage was measured and determined to be about 1.8% for each sample. Warpage was very slight to none by visual inspection. After three days no additional shrinkage could be detected. After forty days total linear shrinkage was found to be about 2.5%.

The compressive, flexural and tensile strengths of castings made in accordance with the invention vary inversely with the water content of the emulsion, as is the case with castings produced in accordance with prior art practice. At a 50% content of water, castings produced by the method of the invention exhibited compressive, flexural and tensile strengths superior to the same emulsion composition made by prior art practice. Other physical properties, such as resistance to chemical attack and environmental aging, are comparable to prior art products of the same composition.

I claim:

1. A process for production of a microcellular, cast resin product, comprising the steps of providing a water-in-oil emulsion containing polymerizable components, polymerization initiators for said components, emulsifier, and water, said polymerizable components including an organic liquid having at least one ethylenically unsaturated group, and said emulsifier including a substantially water-insoluble polymeric compound which is soluble in said organic liquid, said components and initiators being so selected as to cause an exothermic reaction resulting in partial polymerization of said components; casting said emulsion in a mold wherein said emulsion converts to a cast gel having a microcellular structure within which water is dispersed and wherein said exothermic reaction starts with resultant partial polymerization of said components without breaking said emulsion; placing the partially polymerized casting in a fluid medium maintained at a temperature and pressure such that evaporation of water and polymerizable components from said casting is inhibited but sufficient to promote continued cross linking of said components; and retaining said casting in said fluid medium for a time sufficient to bring all parts of said casting to a temperature which completes polymerization of said components while retaining water and polymerizable components within said microcellular structure and minimizing shrinkage and warpage of the resulting resin product.

2. The process of claim 1, wherein the temperature of said fluid medium ranges from about 50° to about 115° C. (about 120° to about 240° F).

3. The process of claim 2, wherein said fluid medium is a water bath maintained at a temperature of from about 60° to 100° C. (about 140° to 212° F.).

4. The process of claim 3, wherein said water bath is maintained at a temperature of from about 75° to 95° C. (about 167° to 203° F.).

5. The process of claim 2, wherein said fluid medium is one of saturated steam, oil, halogenated organic heat exchange medium and fused salts, all of which are inert to said resin, maintained at a temperature of from greater than 100° to about 115° C. (212° to about 240° F.), and wherein said fluid medium is maintained under superatmospheric pressure sufficient to prevent boiling of the water within said microcellular structure.

6. The process of claim 1, wherein the water content of said emulsion ranges from about 1% to about 90% by weight.

7. A process for production of a microcellular cast resin product, comprising the steps of providing a water-in-oil emulsion containing polymerizable components, polymerization initiators for said components, emulsifier, and water in an amount ranging from about 1% to less than about 50% by weight, said polymerizable components including an organic liquid having at least one ethylenically unsaturated group, and said emulsifier including a substantially water-insoluble polymeric compound which is soluble in said organic liquid, said components and initiators being so selected so as to cause an exothermic reaction resulting in partial polymerization of said components; casting said emulsion in a mold wherein said emulsion converts to a cast gel having a microcellular structure within which water is dispersed and wherein said exothermic reaction starts with resultant partial polymerization of said components without breaking said emulsion; controlling the temperature of the casting to a level less than 100° C. (212° F.) during said exothermic reaction; removing the partially polymerized casting from said mold; placing the partially polymerized casting in a fluid medium maintained at a temperature and pressure such that evaporation of water and polymerizable components from said casting is inhibited but sufficient to promote continued cross linking of said components; and retaining said casting in said fluid medium for a time sufficient to bring all parts of said casting to a temperature which completes polymerization of said components while retaining water within said microcellular structure and minimizing obtaining uniformly reproducible shrinkage and warpage of the resulting resin product.

8. The process of claim 7, wherein said step of controlling the temperature of said casting comprises placing said casting in a liquid maintained at a temperature of about 10° to 20° C. (about 50° to 68° F.) for a period of time sufficient to terminate said exothermic reaction before the temperature of said casting reaches 100° C. (212° F.).

9. The process of claim 7, wherein the water content of said emulsion ranges between about 10% and 45% by weight.

10. A process for production of a microcellular, cast resin product, comprising the steps of providing a water-in-oil emulsion containing polymerizable components, polymerization initiators for said components, emulsifier, and water in an amount ranging from about 50% to about 90% by weight, said polymerizable components including an organic liquid having at least one ethylenically unsaturated group, said emulsifier including a substantially water-insoluble polymeric compound which is soluble in said organic liquid, said components and initiators being so selected as to cause an exothermic reaction resulting in partial polymerization of said components; casting said emulsion in a mold wherein said emulsion converts to a cast gel having a microcellular structure within which water is dispersed and wherein said exothermic reaction starts with resultant partial polymerization of said components without breaking said emulsion; removing the partially polymerized casting from said mold; placing said casting in a fluid medium maintained at a temperature and pressure such that evaporation of water and polymerizable components is inhibited but sufficient to promote continued cross linking of said components; and retaining said casting in said fluid medium for a time sufficient to bring all parts of said casting to a temperature which completes polymerization of said components while retaining water within said microcellular structure and obtaining uniformly reproducible shrinkage and minimizing warpage of the resulting resin product.

11. The process of claim 7 or 10, wherein said microcellular structure is of the open cell type, and including the further step of heating the completely polymerized resin product in a dry atmosphere at a temperature of about 70° to about 125° C. (about 160° to about 255° F.), whereby to evaporate at least a predominant part of the water retained within said microcellular structure.

12. The process of claim 1, wherein said organic liquid comprises at least one of an acrylic acid ester, a methacrylic acid ester, styrene, acrylonitrile, and a vinyl ester.

13. The process of claim 1, wherein said polymeric compound comprises one of an unsaturated polyester obtained from an unsaturated polycarboxylic acid and a polyhydric alcohol; a polyvinyl ester; and polystyrene.

14. The process of claim 10, wherein said polymerization initiators include at least one of a peroxide, a cobalt compound, and a tertiary amine.

15. The process of claim 7 or 11, wherein said microcellular structure is of the open cell type.

16. The process of claim 1, wherein said emulsifier includes unsaturated polyester obtained from the reaction of a polycarboxylic acid, at least a portion of which is unsaturated, and a polyhydric alcohol; and wherein said polymerizable components include an ethylenically unsaturated solvent for said polyester which is copolymerizable therewith.

17. The process of claim 16, wherein said polyester contains the reaction product of at least one of phthalic acid, isophthalic acid, terephthalic acid, maleic acid and fumaric acid with a glycol.

18. The process of claim 16, wherein said ethylenically unsaturated solvent is styrene.

19. The process of claim 16, wherein said ethylenically unsaturated solvent is at least one of an acrylic acid ester, a methacrylic acid ester, styrene, acrylonitrile, and a vinyl ester.

20. The process of claim 16, wherein said polymerization initiators include peroxide catalyst, cobalt salt promoter, and tertiary amine promoter.

21. The process of claim 16, wherein the weight ratio of said polyester to said solvent is from about 1:5 to 2:1.

22. The process of claim 10, wherein said microcellular structure is of the closed cell type.

23. The process of claim 22, wherein the water content of said emulsion ranges from about 60% to about 90%, and including the further step of heating the completely polymerized resin product in a dry atmosphere at a temperature of about 70° to about 125° C. (about 160° to about 255° F.), whereby to evaporate at least a predominant part of the water retained within said microcellular structure.

24. The process of claim 1, wherein said microcellular structure has cell diameters not exceeding about 100μ.

25. The process of claim 10, wherein said mold is fabricated from flexible, low density polyethylene.

26. The process of claim 1, including the step of applying a polyurethane surface coating to said resulting resin product.

27. The process of claim 1, wherein said casting is retained in said fluid medium for a time sufficient to bring all parts of said casting to a substantially uniform temperature.

* * * * *

UNITED STATES PATENT AND TRADEMARK OFFICE
CERTIFICATE OF CORRECTION

PATENT NO. : 4,775,502
DATED : October 4, 1988
INVENTOR(S) : Harry H. Chafvin, Jr.

It is certified that error appears in the above—identified patent and that said Letters Patent is hereby corrected as shown below:

Column 5, line 23, "5%" should read --45%--.

Column 5, line 26, "0%" should read --90%--.

Column 13, line 8, "minimizing" should be deleted.

Column 13, line 9, "minimizing" should be inserted after "and".

Column 13, line 32, "reaotion" should read --reaction--.

Column 13, line 7, after "water" insert --and polymerizable components--.

Signed and Sealed this

Eighteenth Day of April, 1989

*Attest:*

DONALD J. QUIGG

*Attesting Officer*   Commissioner of Patents and Trademarks